United States Patent
Kurosawa et al.

(10) Patent No.: US 6,466,954 B1
(45) Date of Patent: Oct. 15, 2002

(54) METHOD OF ANALYZING A LAYOUT STRUCTURE OF AN IMAGE USING CHARACTER RECOGNITION, AND DISPLAYING OR MODIFYING THE LAYOUT

(75) Inventors: Yoshiaki Kurosawa; Katsumi Kato, both of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/268,728

(22) Filed: Mar. 17, 1999

(30) Foreign Application Priority Data

Mar. 20, 1998 (JP) .......................................... 10-071612

(51) Int. Cl.[7] ............................................... G06F 17/21
(52) U.S. Cl. ......................... 707/520; 382/182; 382/292
(58) Field of Search ................................ 707/517, 500, 707/520; 382/292, 293, 176, 177, 181, 182

(56) References Cited

U.S. PATENT DOCUMENTS

| 5,018,083 A | * | 5/1991 | Watanabe et al. ........... 707/517 |
| 5,241,674 A | | 8/1993 | Kurosawa |
| 5,742,837 A | * | 4/1998 | Fukui et al. ................. 707/517 |
| 5,900,002 A | * | 5/1999 | Bottomly ..................... 707/517 |
| 5,911,145 A | * | 6/1999 | Arora et al. ................. 345/853 |
| 6,324,554 B1 | * | 11/2001 | Watanabe et al. ........... 345/839 |
| 6,327,387 B1 | * | 12/2001 | Naoi et al. .................. 382/173 |

OTHER PUBLICATIONS

Weinmann, Elaine. Quark XPress For Macintosh. Peachpit Press: California, 1993. pp. 24,37,39,40,41,44,86,97,100, 101,105,136,197.*

* cited by examiner

*Primary Examiner*—Joseph H. Feild
(74) *Attorney, Agent, or Firm*—Oblon, Spivak, McClelland, Maier & Neustadt, P.C.

(57) ABSTRACT

A document image processing apparatus. A layout analysis section analyzes a layout structure of an input image. A layout information memory section stores layout information representing a relationship between the layout structure and a corresponding area in the input image. An image display section displays the corresponding area in the input image according to the layout information. An indication input section inputs an indication to modify the corresponding area in the input image displayed. A modification section modifies the corresponding area in the input image and the layout structure of the corresponding area in the layout information according to the indication.

21 Claims, 13 Drawing Sheets

METHOD OF ANALYZING A LAYOUT STRUCTURE OF AN IMAGE USING CHARACTER RECOGNITION, AND DISPLAYING OR MODIFYING THE LAYOUT

BACKGROUND OF THE INVENTION

1. Field of the Invention

The present invention relates to a document image processing apparatus and a method for analyzing a layout structure of an input document.

2. Description of the Related Art

In general, in a document image processing apparatus to input a document as the image data (for example, a facsimile apparatus or a copy machine), a user indicates the necessary area to be edited from the document on a display using a pointing device. The indicated area is edited by the user's operation. However, in the document image processing apparatus of the prior art, the user's editing is limited to an extraction of the indicated area from the document, or a simple enlargement and a simple reduction of the indicated area because of the function characteristic required for the document image processing apparatus. Furthermore, in the prior art, the user must decide the necessary area to be edited in the document and correctly indicate this area on the display by the pointing device. Accordingly, this operation is troublesome for the user.

In Japanese Patent Application PH7-180442, each area is automatically extracted from an input document and this area image is displayed. The user can execute editing such as deletion, division, or unification for this area by using the pointing device. However, in this technique, the editing is limited to deletion, division, and unification. This editing function is not sufficient for the user to manage the document image.

As mentioned-above, in the document image processing apparatus of the prior art, editing of the document image is limited to extraction, division, unification, and simple enlargement/reduction. In short, this editing is not sufficient for the user. Furthermore, the user must directly indicate the area to be edited from the document image on the display using the pointing device. Therefore, this operation is troublesome for the user.

SUMMARY OF THE INVENTION

It is an object of the present invention to provide a document image processing apparatus and method able to easily execute various kinds of editings for the document image data.

According to the present invention, there is provided a document image processing apparatus, comprising: a layout analysis means for analyzing a layout structure of an input image; a layout information memory means for storing layout information representing a relation between the layout structure and corresponding area in the input image; an image display means for displaying the corresponding area in the input image according to the layout information; an indication input means for inputting an indication to modify the corresponding area in the input image displayed by said image display means; and a modification means for modifying the corresponding area in the input image and the layout structure of the corresponding area in the layout information according to the indication.

Further in accordance with the present invention, there is also provided a document image processing method, comprising the steps of: analyzing a layout structure of an input image; storing layout information representing a relation between the layout structure and corresponding area in the input image; displaying the corresponding area in the input image according to the layout information; inputting an indication to modify the corresponding area in the input image displayed at the displaying step; and modifying the corresponding area in the input image and the layout structure of the corresponding area in the layout information according to the indication.

Further in accordance with the present invention, there is also provided a computer readable memory, comprising: an instruction means for causing a computer to analyze a layout structure of an input image; an instruction means for causing a computer to store layout information representing the relation between the layout structure and corresponding area in the input image; an instruction means for causing a computer to display the corresponding area in the input image according to the layout information; an instruction means for causing a computer to input an indication to modify the corresponding area in the input image displayed; and an instruction means for causing a computer to modify the corresponding area in the input image and the layout structure of the corresponding area in the layout information according to the indication.

DETAILED DESCRIPTION OF THE PREFERRED EMBODIMENTS

Figure 1:
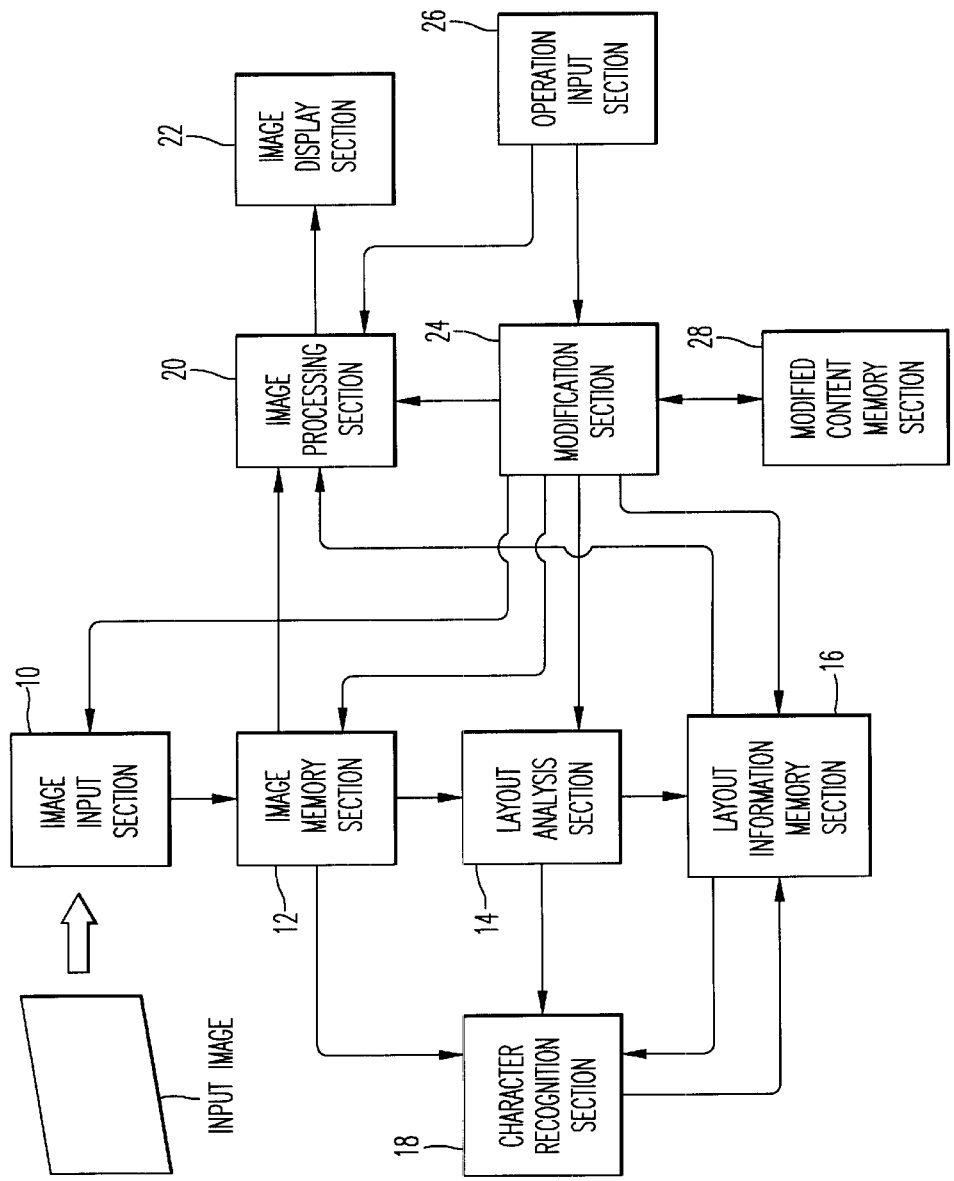
FIG. 1 is a block diagram of the document image processing apparatus according to the present invention.

Embodiments of the present invention are described below with reference to the drawings. FIG. 1 is a block diagram of the document image processing apparatus according to the present embodiment. This document image processing apparatus is realized by a computer in which the operation is controlled by a program. This program is already recorded in memory media such as CD-ROM, DVD, magnetic disk, and loaded by the computer to be operated. As shown in FIG. 1, the document image processing apparatus includes an image input section 10, an image memory section 12, a layout analysis section 14, a layout information memory section 16, a character recognition section 18, an image processing section 20, an image display section 22, a modification section 24, an operation input section 26, and a modified content memory section 28.

The image input section 10 inputs a document in which characters or other information are recorded as the image data. For example, this document is optically scanned by a scanner apparatus. The input image data is stored in the image memory section 12. In this case, the characters recorded in the document comprise a plurality of character lines and paragraphs. Each paragraph consists of a plurality of character lines. Each character line consists of a plurality of words. In addition to this, various kinds of figures such as a photograph figure or a handwritten figure may be included in the document. These figures respectively correspond to one block.

The document image data in the image memory section 12 is supplied to the layout analysis section 14, a character recognition section 18, and the image processing section 20. The layout analysis section 14 analyzes the layout structure of the characters recorded in the document image data, and the analysis result is stored in the layout information memory section 16. The layout information memory section 16 stores the layout information representing the relation between the layout structure and the corresponding attribute information in the document image. The attribute information includes recognition result of the characters in the document image. The character recognition section 18 recognizes the characters in each block analyzed by the layout analysis section 14. This character recognition result is stored in the layout information memory section 16 as the attribute information corresponding to the layout structure of each block.

The image processing section 20 supplies the document image stored in the image memory section 12 and each area representing the layout structure to the image display section 22 according to the layout information stored in the layout information memory section 16. In this case, each area is displayed to overlap with the document image. For example, the area representing a block extracted by layout analysis is displayed as a rectangle frame. Furthermore, the image processing section 20 supplies a character area determined by a first indicated position and a second indicated position on the document image to the image display section 22 according to the layout information. In this case, the characters area changes on the document image in proportion to change of the second pointed position based on the first pointed position. The image display section 22 displays the document image and information of the layout analysis result by control of the image processing section 20.

The modification section 24 inputs an indication of editing on the displayed area from the operation input section 26, and modifies the image data stored in the image memory section 12 and the layout information stored in the layout information memory section 16 according to the indication. Furthermore, the modification section 24 executes a calculation processing of the numerals recognition result by the character recognition section 18 in response to the indication position on the displayed area.

The operation input section 26 inputs the indication of various kinds of editing for the document image, and informs the indication to the modification section 24. Furthermore, the operation input section 26 inputs the indication of the area to be edited. This indicated area is displayed through the image display section 22 by the predetermined display status. The modified content memory section 28 stores the content modified by the modification section 24 according to the layout structure. This modified content in the modified content memory section 28 is referred by the modification section 24 in order to apply for modification of other image data.

Figure 2:
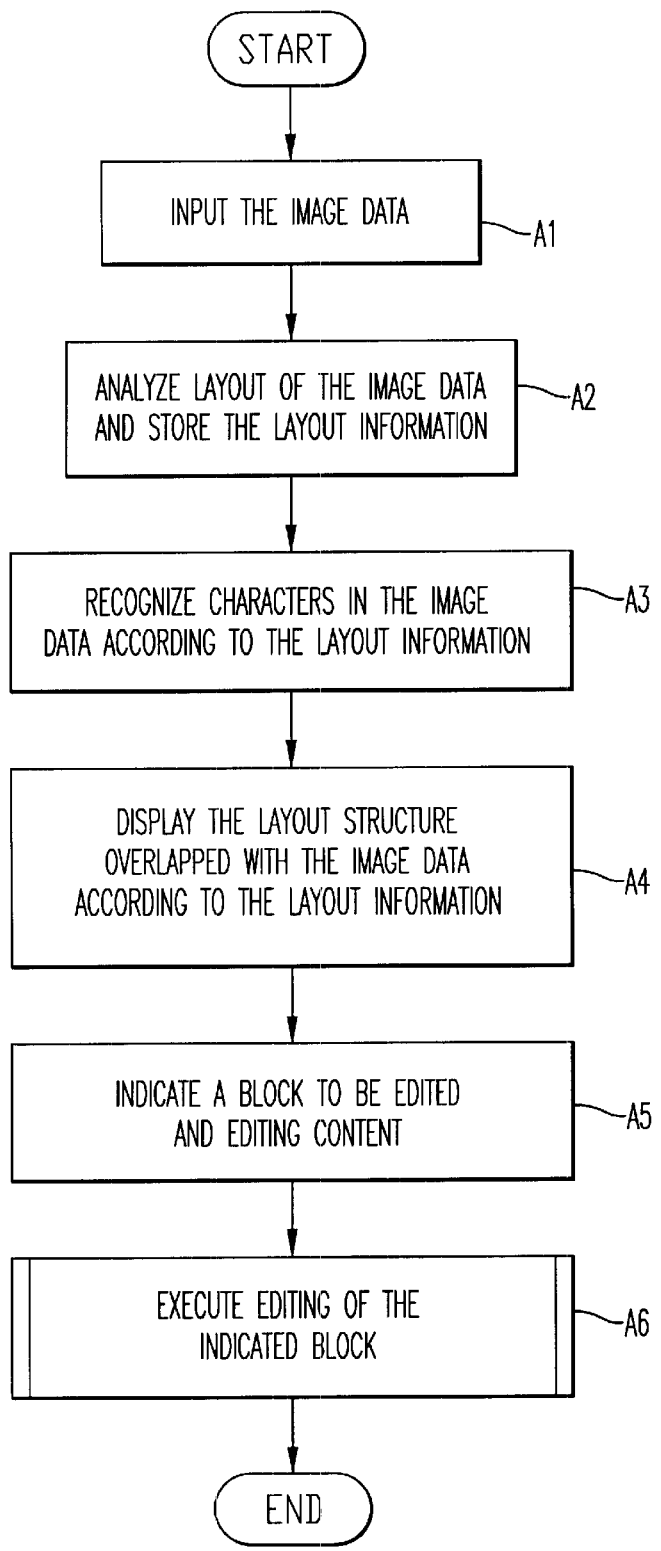
FIG. 2 is a flow chart of basic processing of the document image processing method according to the present invention.

Next, the detail processing of the document image processing apparatus according to the present invention is explained. FIG. 2 is a flow chart of the basic processing of the document image processing apparatus according to the present invention. First, the image input section 10 inputs the document as the image data by optical operation such as a scanner apparatus. This document image data is stored in the image memory section 12 (step A1). In the document, except for a text block consisting of characters, assume that a block such as a photograph area or a figure area exists. The layout analysis section 14 executes the layout analysis for the image data stored in the image memory section 12 (step A2). This analysis result is stored in the layout information memory section 16 as the layout information. Concretely speaking, the layout analysis section 14 extracts each position of the paragraphs, the character lines, and the words in the text block of the document image. This technique is realized by the known layout analysis method shown in Japanese Patent Disclosure (Kokai) PH9-167233. The paragraph (including the photograph area and the figure area), and the character line and the word extracted by the layout analysis is respectively called a block, a character line block, and a word block.

Figure 3:
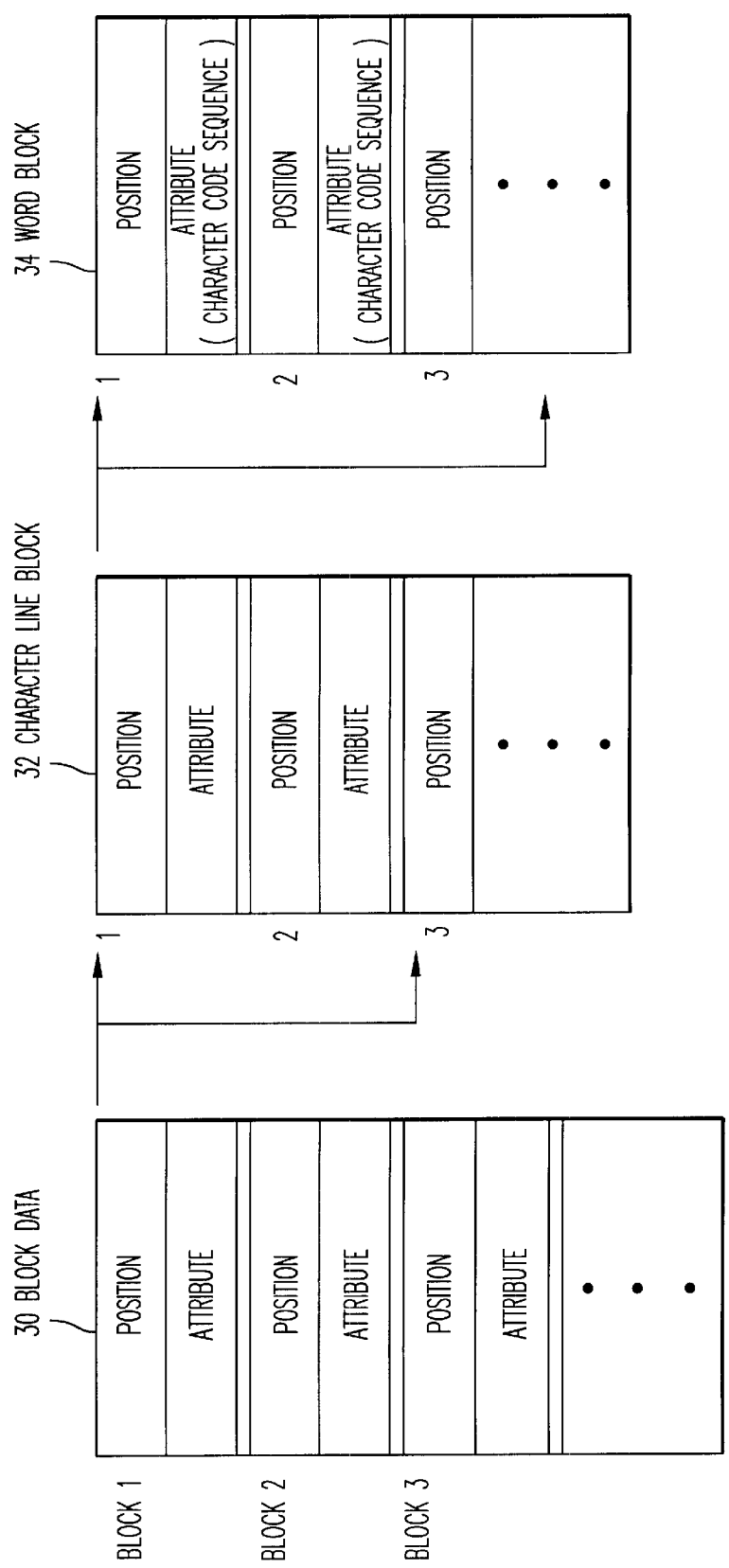
FIG. 3 is a schematic diagram of data structure of a layout information memory section 16 in FIG. 1.
Figure 4A:
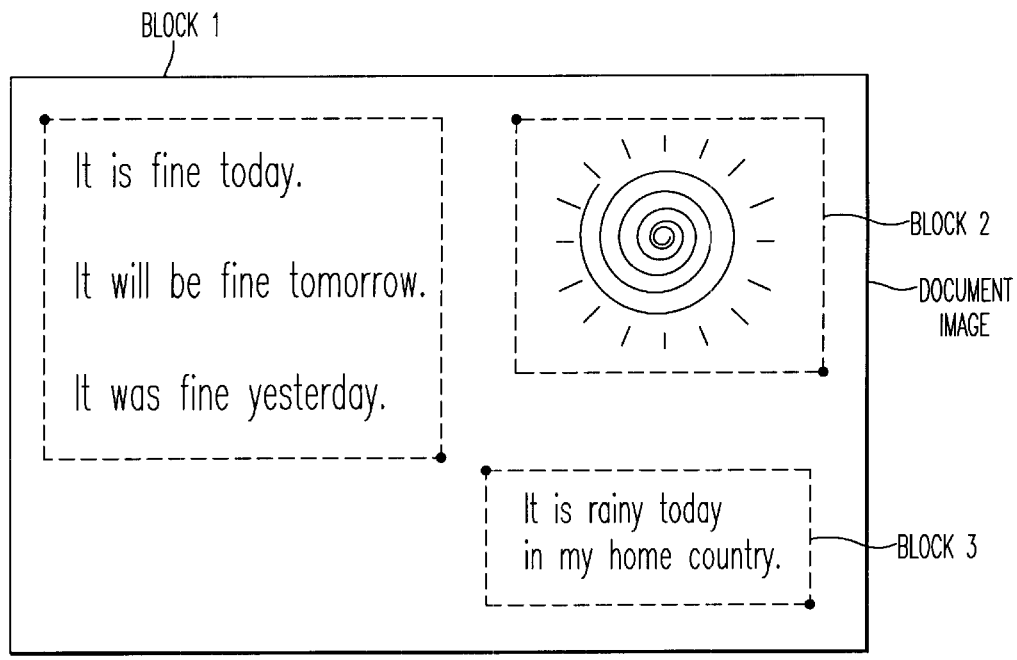
FIGS. 4A–4C are schematic diagrams of one example of the document image data to be edited.
Figure 4B:
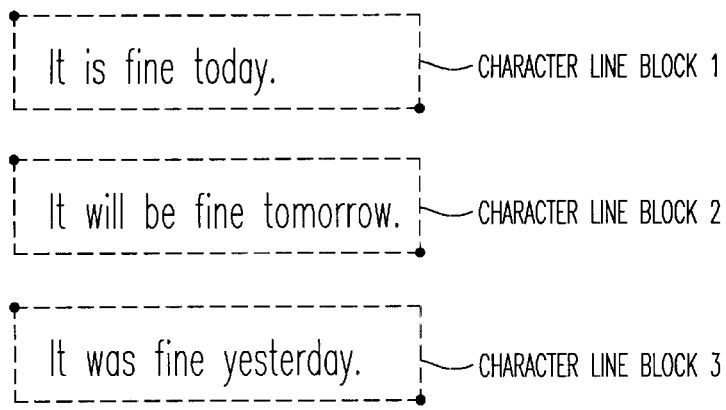
Figure 4C:
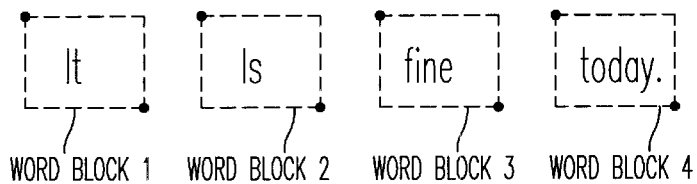

FIG. 3 shows one example of a data structure in the layout information memory section 16. FIGS. 4A–4D show examples of the document image data for each block. In FIG. 4A, two paragraphs are extracted as blocks 1 and 3 and one figure area is extracted as block 2 from the document image. In FIG. 4B, three character lines in the block 1 are extracted as character line blocks 1, 2, and 3. In FIG. 4C, four words in the character line block 1 are extracted as word blocks 1, 2, 3, and 4. The position of each block is represented as coordinates of two peak points (a left upper corner, a right lower corner) on a diagonal line of the rectangle frame circumscribing the block. In FIGS. 4A–4C, two black dots of the left upper corner and the right lower corner of each block represent the position data in the layout information. As for each extracted block shown in FIGS. 4A–4C, the layout information memory section 16 hierarchically stores the block data as shown in FIG. 3. As the block data 30 of the highest level block, position data and corresponding attribute data are stored by unit of the block (1, 2, 3, . . . ). As the character line block 32 of the middle level block, position data and corresponding attribute data are stored by unit of the character line block (1, 2, 3, . . . ). In this case, a plurality of character line blocks are linked to the paragraph block in which the plurality of character line blocks are included. As the word block 34 of lowest level block, position data and corresponding attribute data are stored by unit of the word block (1, 2, 3, . . . ). In this case, a plurality of word blocks are linked to the character line block in which the plurality of word blocks are included. The attribute data may include any information representing the characteristic of the block.

After execution of the layout analysis of the layout analysis section 14, the character recognition section 18 recognizes each character image existing in the word block according to the layout information stored in the layout information memory section 16 (step A3). Concretely speaking, the character recognition section 18 extracts each character image from the document image according to the position data of each character image in the word block, recognizes the character image by referring to a character recognition dictionary, and generates a character code as a recognition result. A character code sequence of character images in the word block is stored corresponding to the position of the word block as the attribute data in the layout information memory section 16. In this case, it is not necessary to always execute character recognition processing. This processing may be executed for a predetermined block in the document image.

The image processing section 20 outputs the document image stored in the image memory section 12 and each area (block) representing the layout structure (for example, a rectangle frame in FIG. 4A) through the image display section 22. In this embodiment, each block is displayed to overlap with the document image. In this case, a unit of the block (a paragraph, a character line, or a word) on the document image may be indicated by the operation input section 26. In response to the indication from the operation input section 26, the layout information is read from the layout information memory section 16, and each block corresponding to the indicated unit is displayed. Furthermore, the document image stored in the image memory section 12 may be an original image or an artificial image modified from the original image.

When an indication to select one block from all blocks on the image display section 22 is input by the operation input section 26, the modification section 24 selects the one block according to the layout information and the indicated position on the document image. When an operation command to edit the one block is input by the operation input section 26 (step A5), the modification section 24 edits the one block according to the operation command (step A6). In short, the modification section 24 edits the image data of the one block stored in the image memory section 12 and updates the layout information of the one block stored in the layout information memory section 16.

Next, a concrete example of modification processing by using the layout information is explained.

(1) Change of Document Layout; Change of Position Relation of each Block

When a block to be moved is selected and a moving destination is input on the document image by the operation input section 26, the modification section 24 extracts the image data of the selected block from the image memory section 12 by referring to the position data of the layout information of the selected block in the layout information memory section 16, and deletes the image data of the selected block at the original position on the document image. Next, the modification section 24 puts the image data of the selected block on the moving destination of the document image. Furthermore, the modification section 24 updates the layout information of the selected block in the layout information memory section 16 according to the moving edit. In short, the position data of the selected block is changed as the position of the moving destination. In this way, the selected block is moved on the document image.

When a block to be rotated is selected and the rotation quantity is input on the document image by the operation input section 26, the modification section 24 extracts the image data of the selected block by referring to the position data of the layout information, generates a rotated image data by geometrically transforming the image data in proportion to the rotation quantity, and replaces the image data with the rotated image data on the document image. Furthermore, the modification section 24 updates the layout information of the selected block in the layout information memory section 16 according to the rotation editing. In this way, the selected block is rotated on the document image.

(2) Editing for Local Block

When a block to be moved (enlargement/reduction) is selected and the parameter of enlargement/reduction is input by the operation input section 26, the modification section 24 extracts the image data of the selected block by referring to the position data of the layout information, and deletes the image data of the selected block at the original position on the document image. Next, the modification section 24 enlarges or reduces the image data of the selected block according to the parameter of enlargement/reduction, and puts the enlarged or reduced image data on the original position of the document image. In this case, the original position to put on the enlarged/reduced image data is based on a center position of the original area or one peak point of a rectangle representing the original area. The modification section 24 updates the layout information of the selected block in the layout information memory section 24. In this way, the enlargement/reduction of the selected block is realized. Furthermore, the modification section 24 may execute editing such as change of the vertical/horizontal size, or thickness of character line pattern for the image of the selected block according to the indication of editing content. In case the image data of the selected block is a multi-valued image, the modification section 24 may execute editing such as a dither operation or density value conversion for the image of the selected block. In case of a color image, an operation of color conversion may be executed.

Next, editing by use of the character recognition result for the selected block may be executed. In this case, when a block in which character font is changed is selected and the kind of font is input by the operation input section 26, the modification section 24 extracts the character recognition result with the position data in the selected block by referring to the layout information of the selected block, and deletes the image data of the selected block at the position on the document image. The modification section 24 displays the character image according to prestored character font information instead of the deleted image. Concretely speaking, the indicated kind of character fonts corresponding to the character recognition result (character codes) in the selected block is read out, and the character font image is put in the original position of the document image by using the position data. In this way, the original character image in the selected block is replaced by the user's desired character font image (for example, Gothic type). In this case, the style and size of the character font may be indicated by the operation input section 26 or determined according to the character recognition result by the character recognition section 18.

Next, content represented by the characters in the block may be changed in addition to changing the character font. In this case, when the block containing the character content to be changed is selected and new character content (character code sequence) is input by the operation input section 26, the modification section 24 extracts the position data of the selected block by referring to the layout information of the selected block, and the modification section 24 deletes the original image data of the selected block according to the position data. Instead of the deleted image data, the modification section 24 displays the new content of the characters using the character font information according to the indicated content of characters. Concretely speaking, the modification section 24 reads out the character font corresponding to the new content of the characters (character code sequence), and puts the new content on original position corresponding to the position data of the document image. In this way, the character font information is filled in an entry such as data, or a name of a person on the document image.

(3) Adjustment of Scan Set by Unit of Local Block

Assume that the image quality of a predetermined area is bad (for example, blurred character, broken character) on the document image. In this case, the image quality of the predetermined area is changed by scanning the predetermined area on the original document at high quality condition settings without changing the image quality of other areas on the document image. First, when a block of the predetermined area is selected by the operation input section 26, the modification section 24 instructs the image input section 10 to reinput an image data of the block. In this case, if the original document to input is sent to the scanner apparatus, the image input section 10 scans the original document at high quality condition settings, 18. extracts the image data of the predetermined area from the input document image, and inputs the image data in the position of the predetermined area of the original document image stored in the image memory section 12.

As the high quality condition settings, a high resolution of gray scale or contrast of the image is set. The change of scan condition is set by the operation input section 26. The modification section 24 may change the scan condition according to information of image quality input from the operation input section 26. Furthermore, if the document image is stored as multivalued image, the modification section 24 may change a binary threshold for the predetermined area and generate a high quality image data of the predetermined area according to the binary threshold.

In this way, a low quality image of the predetermined area is replaced by a high quality image while the scan parameters of all of the remaining document image is kept at a predetermined level. In the above-mentioned explanation, the predetermined area to be scanned again is selected as a block by using the layout analysis result. However, this area is not always selected by the layout analysis result. For example, the user may indicate an area to be scanned again from the displayed document image through the operation input section 26. In this case, the modification section 24 executes rescanning of the image data corresponding to the indicated area.

(4) Automatic Pagination

When automatic pagination is indicated by the operation input section 26, the modification section 24 creates a new block of the page number at an indicated position on the document image, and puts a numeral image of the page number (for example, the numeral font) on the new block according to an initial number. For example, in case of automatic pagination for a large number of image data in the same format, the page number is incremented as the initial number "1" and the incremented number image is put on the new block whenever the document image is changed. In case of the layout analysis, the block of the page number in the document image is determined as an independent block for several characters positioned at the lower center part on the document. Therefore, the layout analysis section 14 writes the attribute data as the page number part in the layout information of the new block.

(5) Enlargement/reduction of the Block at High Image Quality

If the enlargement/reduction is uniformly executed for the entire image by unit of bit map, the image quality of a meaning part (for example, character part) falls. Therefore, if the enlargement/reduction of the size is indicated for a predetermined block, the modification section 24 compares the indicated size of the enlargement/reduction with an original size of the predetermined area, and enlarges/reduces a character line space or a word space in the predetermined area according to the comparison result. In short, degradation of the image quality of the character part is prevented while a part, except for the character containing part, in the predetermined area is enlarged/reduced.

Figure 5:
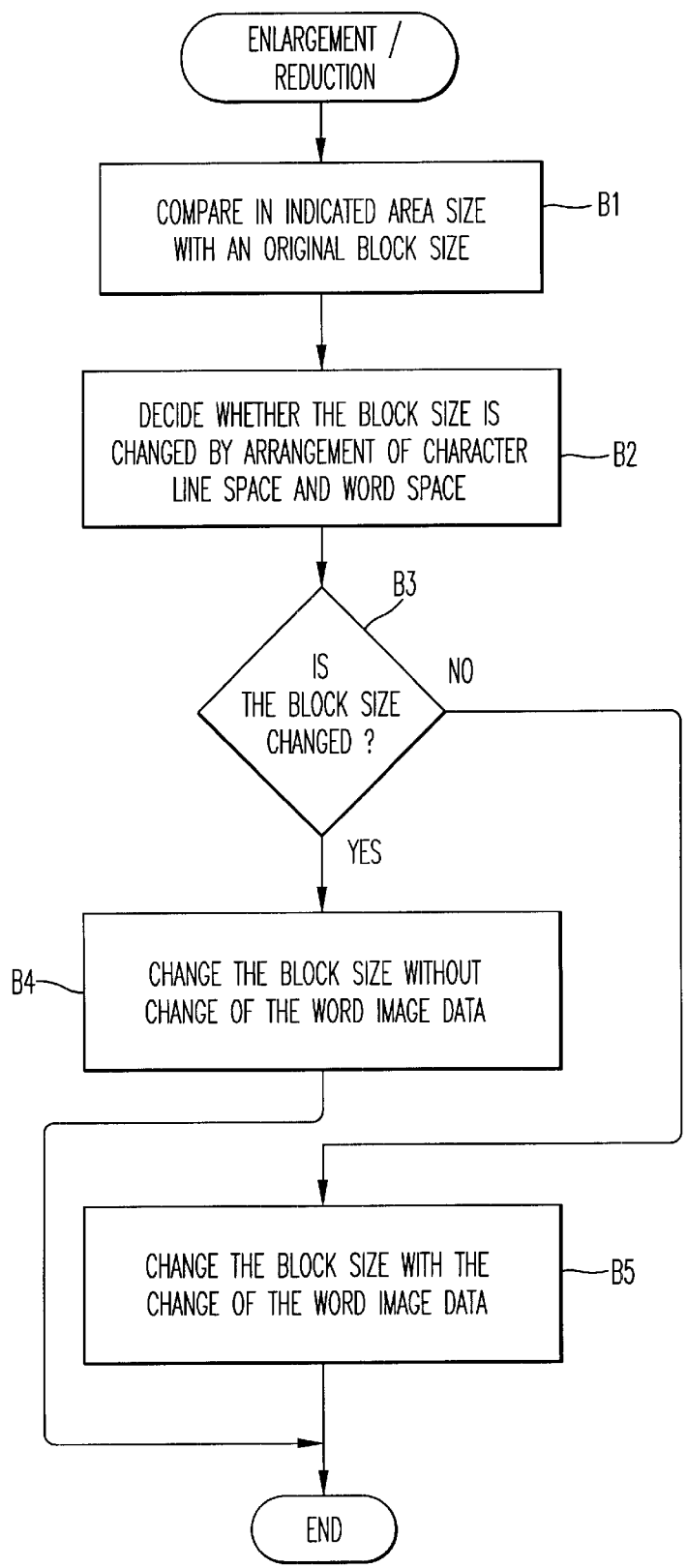
FIG. 5 is a flow chart of the processing of the enlargement/reduction for a block data according to the present invention.

FIG. 5 is a flow chart of the processing of enlargement/reduction for a predetermined block. FIGS. 6A–6E show examples of enlarged/reduced blocks. First, when a block to be enlarged/reduced is selected and the enlarged/reduced size is input by the operation input section 26, the modification section 24 reads out the position data of the selected block and the lower level block (character line block, word block) by referring to the layout information stored in the layout information memory section 16. The modification section 24 compares the enlarged/reduced size with an original size of the selected block (step B1), and decides whether the selected block can be enlarged/reduced to the indicated size by adjustment of the character line space and/or the word space (step B2). If it is possible, the character line space and/or the word space is enlarged/reduced to the indicated size according to the position of the line block and/or the word block (step B3, B4). In short, the size of the selected block is changed while the character image in the selected block is not changed. On the other hand, if it is impossible (for example, the number of the character line spaces and/or the word spaces are not enough), the character part with the character line space and the word space are uniformly enlarged/reduced according to the indicated size (step B5). In short, the size of the selected block is uniformly changed. In both cases, the modification section 24 updates the layout information of the selected block, the line block and the word block according to the enlarged/reduced result.

Figure 6A:
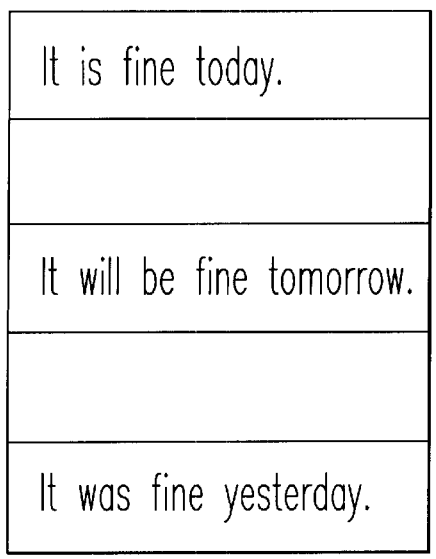
FIGS. 6A–6E are schematic diagrams of concrete examples of enlargement/reduction of the block data.
Figure 6B:
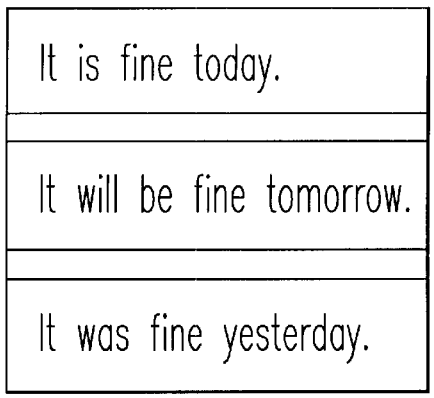
Figure 6C:
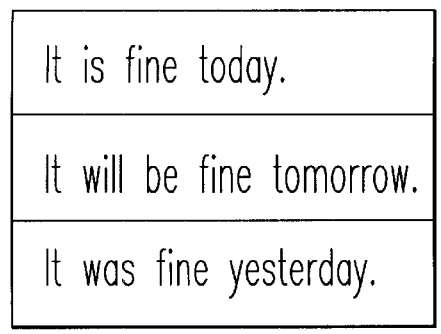

FIGS. 6A–6C show examples of a reduction of the block. As shown in FIG. 6A, if reduction along the vertical direction of a block including a plurality of character lines is indicated by the user, the modification section 24 decides whether the block is reduced by adjustment of the character line space according to the position data of each character line block in the layout information. If it is possible, each character line space is reduced while the image of the character part is not changed as shown in FIG. 6B. If it is impossible, the character parts with the character line space are uniformly reduced in the vertical direction as shown in FIG. 6C. As for the reduction along the horizontal direction, the selected block is reduced in the same way. In general, in accordance with the user's indication from the operation input section 26, adequate reduction is realized by adjustment of the character line space and/or the word space, and reduction ratio of character along the vertical and horizontal direction.

On the other hand, in case of enlargement, the selected block is enlarged by adjustment of the character line space and/or the word space in addition to the enlargement of each character. For example, if the enlargement ratio from the operation input section 26 is larger than double, the modification section 24 decides whether the character is enlarged proportionally. In this case, the character image is enlarged to maximum size within the indicated size, and the character line space and/or the word space is adjusted according to the indicated size. The reason why the character image is enlarged proportionally is that a reduction of quality of the character image is prevented.

Figure 6D:
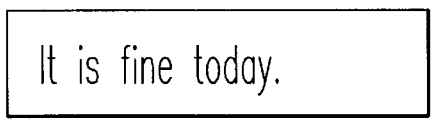
Figure 6E:
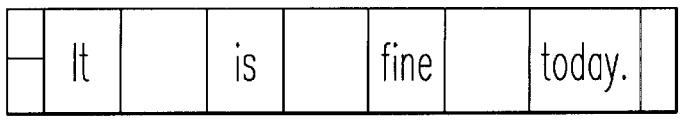

FIGS. 6D and 6E show one example of enlargement along the horizontal direction. Assume that the enlargement is indicated to a character line block shown in FIG. 6D. In this case, the size of the character line block is enlarged by changing the word space without changing the word image as shown in FIG. 6E. In this way, in case of enlargement/reduction of the block, the character line space and/or the word space in the block is changed according to the layout information of the block and the lower level block (the character line block and the word block). Therefore, the indicated enlargement/reduction of block is realized without reducing the quality of the character image.

(6) A method for Generating a Blank Space

Figure 7:
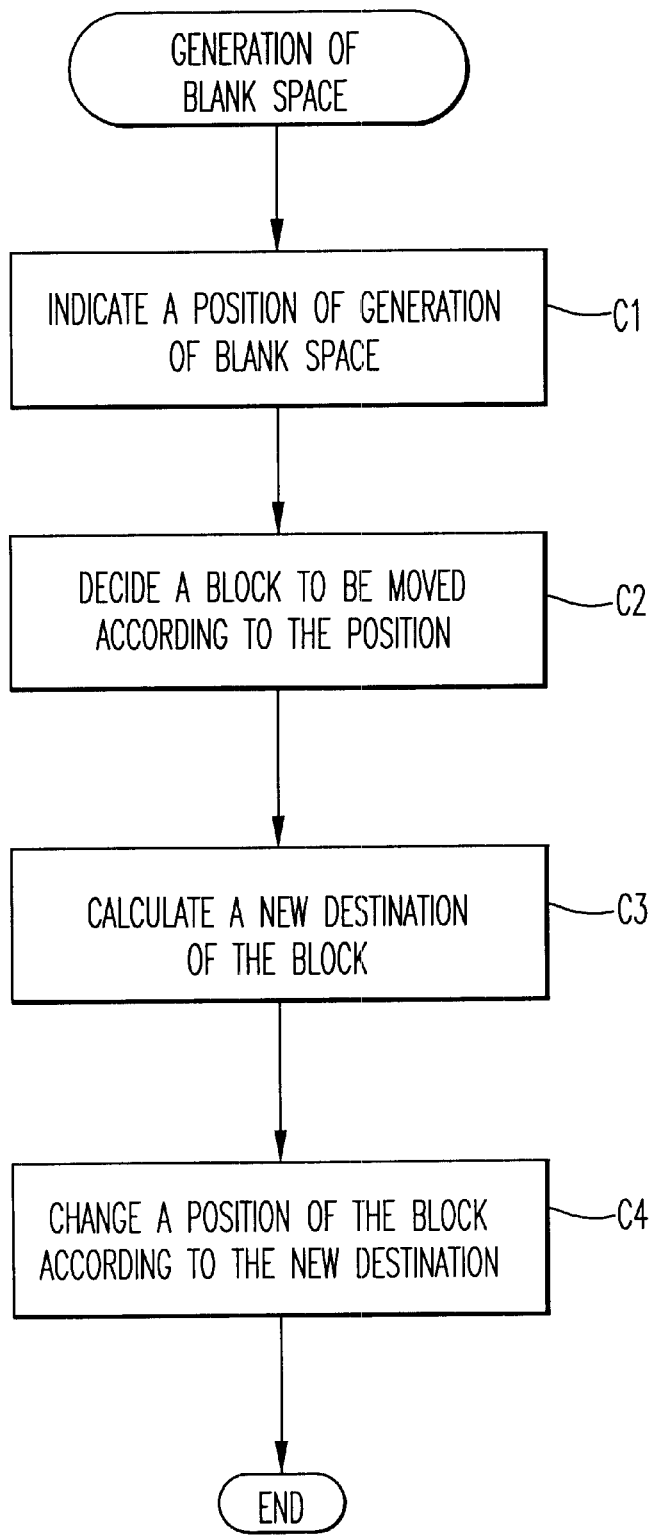
FIG. 7 is a flow chart of processing of the generation of a blank space according to the present invention.
Figure 8B:
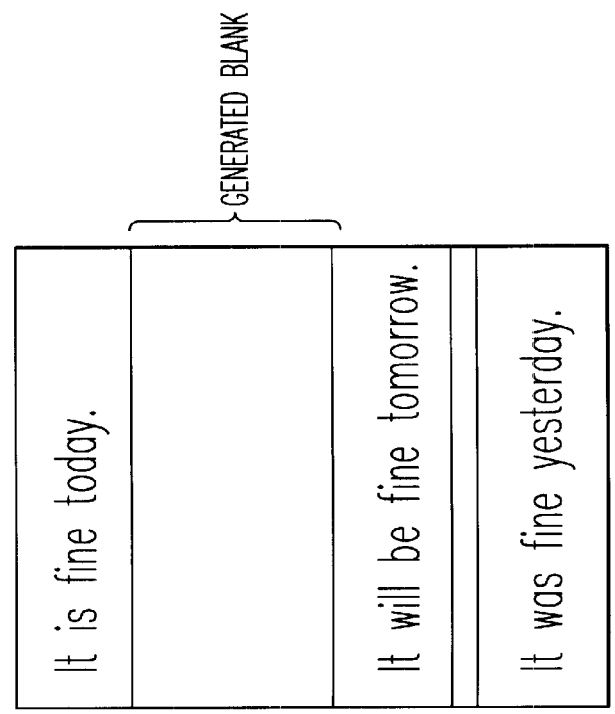
FIGS. 8A and 8B are schematic diagrams of concrete examples of generation of a blank space.
Figure 8A:
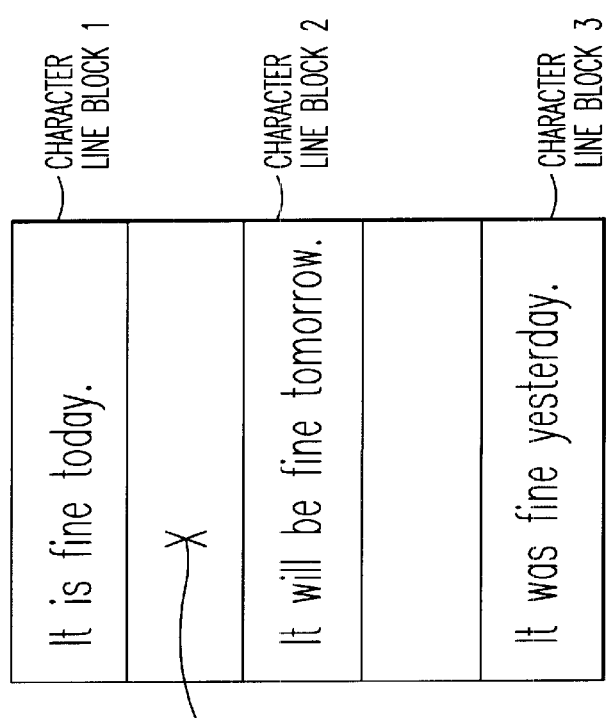

FIG. 7 is a flow chart of the processing of the generation of a blank space. FIGS. 8A and 8B show examples of the generation of a blank space in the block. For example, as shown in FIG. 8A, assume that a position to generate a blank space (blank generation position) is indicated at an arbitrary character line space in the block including a plurality of character line blocks. The modification section 24 decides the character line block to be moved in the block according to the blank space generation position.

In FIG. 8A, the line block 2 located lower than the blank space generation position is decided to be moved downward in the block. The character line blocks 1 and 3 are decided not to be moved because these two character line blocks are respectively located at the edge position along the vertical direction. The modification section 24 calculates a moving destination of the character line block 2 and moves the position of the character line block 2 to the moving destination. In this case, as shown in FIG. 8B, the character line block 2 is moved to the nearest position of the character line block 3 in the block. This moving processing is executed in the same way as explained in "(2) Editing for local block.". As a result, the blank space is generated in the block according to the blank generation position.

As for the character line block whose position is moved by the blank generation, the modification section 24 updates the layout information of the character line block in the layout information memory section 16. Accordingly, new characters or new image can be put on the generated blank space of the block to create a new document image. In short, in order to generate a blank space in the block, the user's editing to respectively move a plurality of character line blocks located near the blank generation position in the block is not necessary.

(7) Indication Method of Block Using the Layout Information

Figure 9:
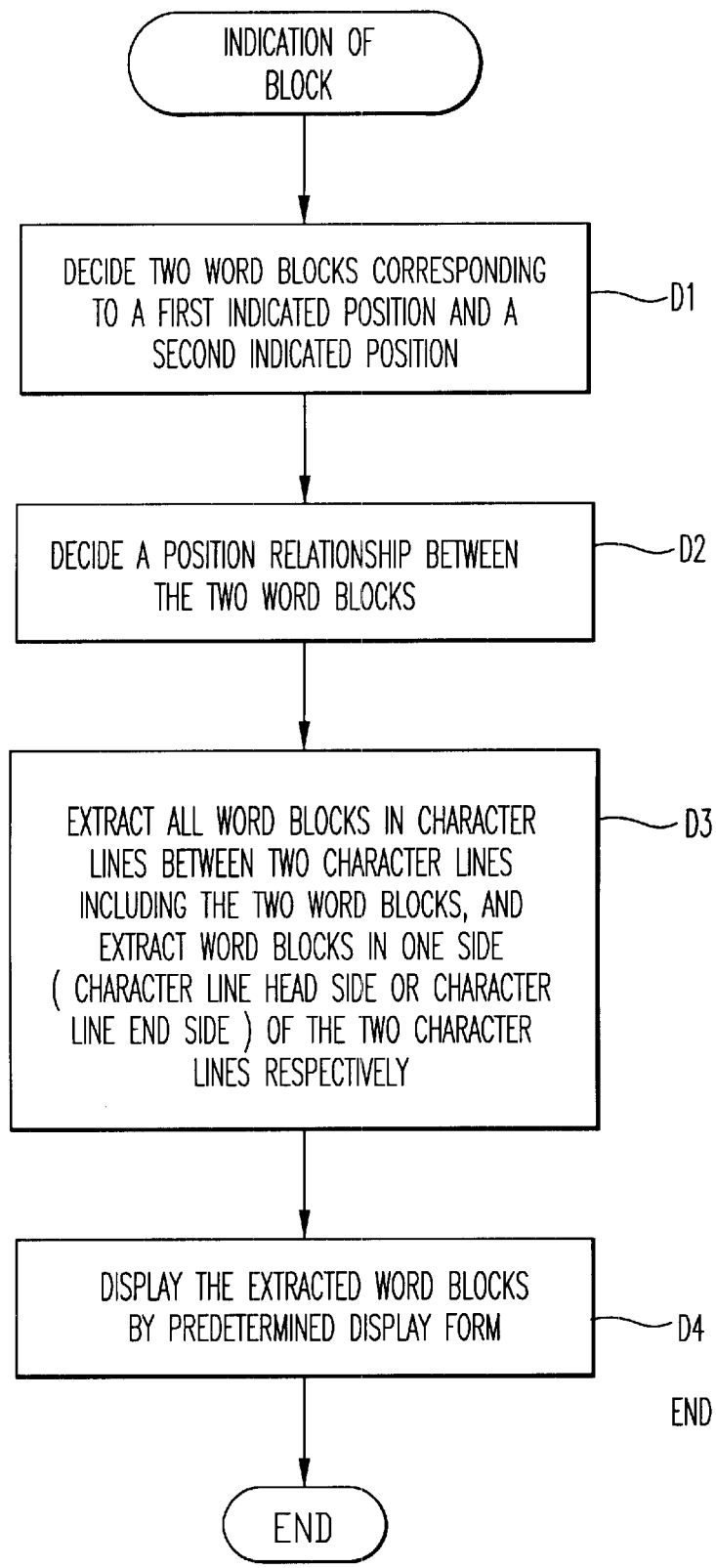
FIG. 9 is a flow chart of the processing of the indication of a block by using the layout information according to the present invention.
Figure 10A:
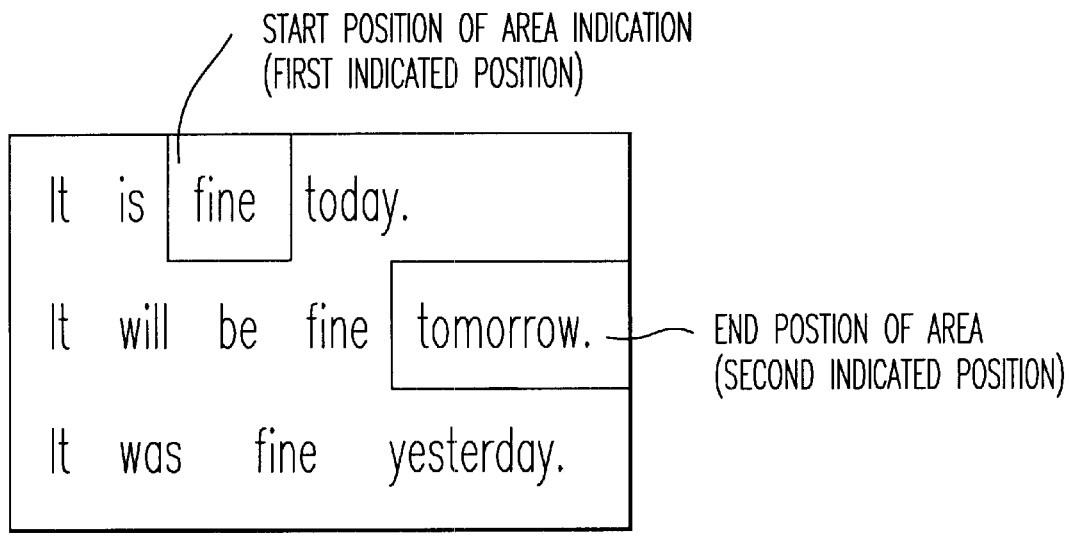
FIGS. 10A and 10B are schematic diagrams of concrete examples of the indication of a block.
Figure 10B:
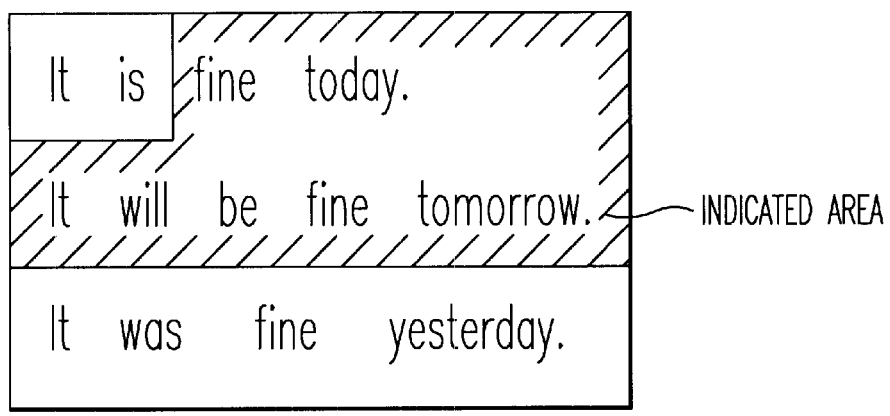

FIG. 9 is a flow chart of the processing of the indication method of a block using the layout information. FIGS. 10A and 10B show examples of an indicated block. In this case, in the same way as the indication of the word block in a displayed document image, the user's desired area is indicated by two word blocks corresponding to a start position and an end position.

FIG. 10A shows an example of the start position and the end position of the indicated area. As mentioned-above, the layout information memory section 16 previously stores the layout information organized by block (paragraph or figure), character line block, and word block in the document image. First, the modification section 20 displays the document image stored in the image memory section 12 through the image display section 22. Assume that the start position (first indicated position) of the user's desired area is input through the operation input section 26. Assume also that the end position (second indicated position) of the user's desired area is consequently input such as a drag operation of the pointing device from the first indicated position (step D1). The image modification section 20 decides the positional relationship between the two word blocks of the first indicated position and the second indicated position according to the layout information of the two word blocks (step D2). In short, the word block of the second indicated position is determined to be located above or below the first indicated position. The image modification section 20 extracts all character line blocks located between two character lines including the first indicated position and the second indicated position, and extracts word blocks in one side (character line head side or character line end side) of the two character lines respectively (step D3).

For example, if the second indicated position is lower than the first indicated position on the document image, word blocks in the character line end side from the first indicated position are extracted from a character line including the first indicated position, and word blocks in the character line head side from the second indicated position are extracted from a character line including the second indicated position. If the second indicated position is higher than the first indicated position on the document image, word blocks in the line head side from the first indicated position are extracted from a character line including the first indicated position, and word blocks in the character line end side from the second indicated position are extracted from a character line including the second indicated position.

The image modification section 20 discriminately displays the extracted character line blocks and word blocks by a predetermined color or an inverted display through the image display section 22 (step D4). As a result, as shown in FIG. 10B, the user's indicated area is discriminately displayed as a predetermined status.

The above-mentioned processing is repeatedly executed according to each second indicated position while the second indicated position is continuously changed such as the drag operation of the pointing device. In the above explanation, the user's desired area is indicated by unit of the word blocks as the start position and the end position. However, the area may be indicated by unit of the character line blocks or the paragraph blocks as the start position and the end position. In this way, the indicated area is regarded as a block to be edited by the modification section 24.

(8) Batch Editing

The content of an editing result by the modification section 24 is stored in the modified content memory section 28. In this case, information of the edited block number and the editing content are stored in the modified content memory section 28. The modification section 24 may then automatically edit another document image in the same way according to the editing content stored in the modified content memory section 28.

Figure 11:
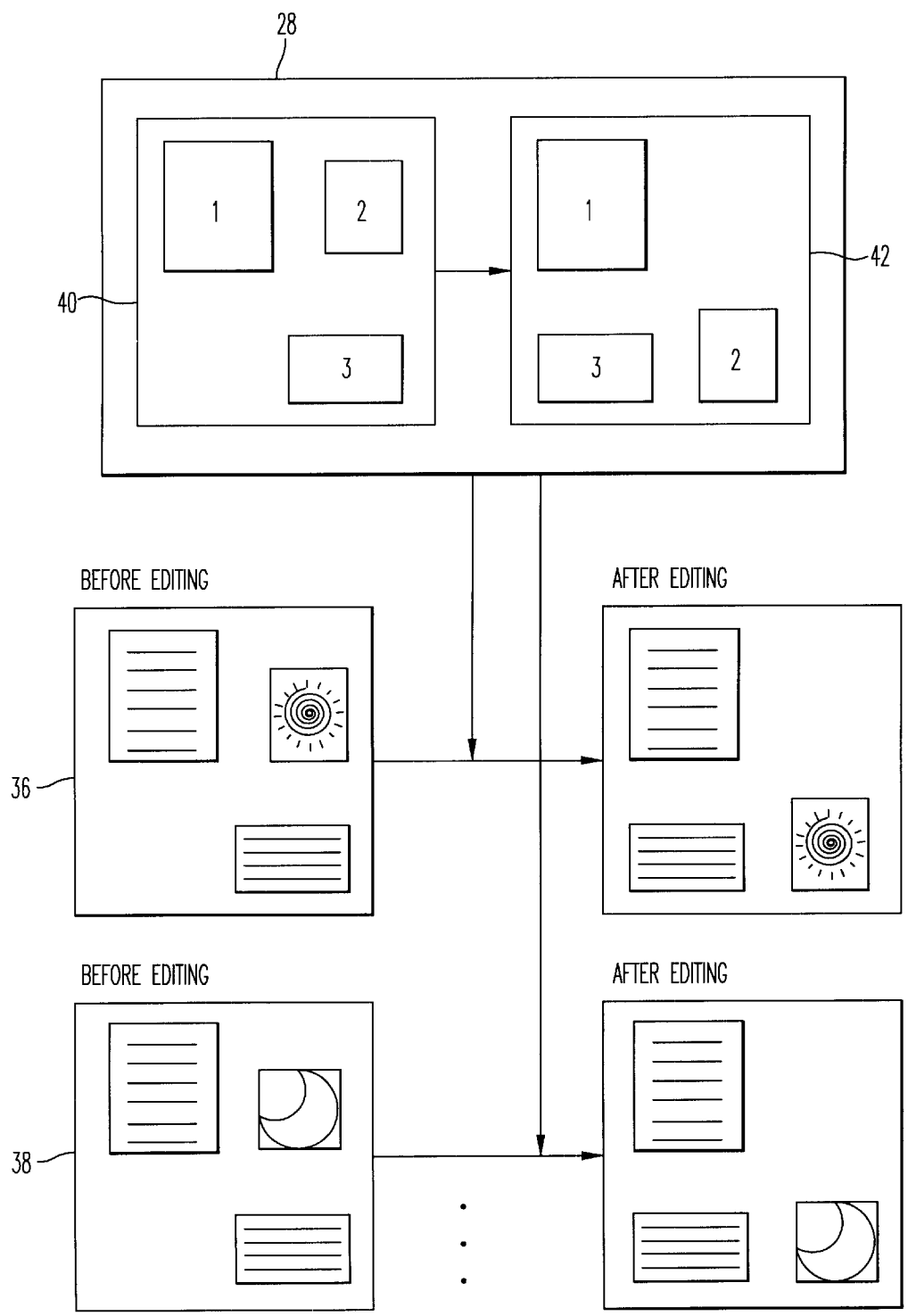
FIG. 11 is a schematic diagram of the editing processing of the document image data by referring to content stored in a modified content memory section 28.

FIG. 11 shows an example of editing two other documents using information stored in the modified content memory section 28. As shown in FIG. 11, assume that a moving edit between two blocks 2 and 3 in the document image are stored in the modified content memory section 28. First, document 40 is edited to become document 42. Then, other document images 36 and 38, whose formats are the same as the unedited original document image 40, are edited in same way as the edited document image 42 according to the editing information in the modified content memory section 28. Therefore, if the other document whose format is same as the edited original document is edited in same way, the user need not perform the operation in each block in the other document (indication of block to be edited, input of editing content).

The above editing operation is not limited to the moving blocks. Each editing operation as aboved-mentioned in sections (1)–(7) is applied. This editing is executed not only on a binary image but also on a multivalued image or a color image. Furthermore, if a blank space is newly generated by editing block data in the document image, an image the same as the background content may be put on the blank in order to apply for the document image including the non-white background.

(9) Calculation Processing by Using the Layout Information

Figure 12:
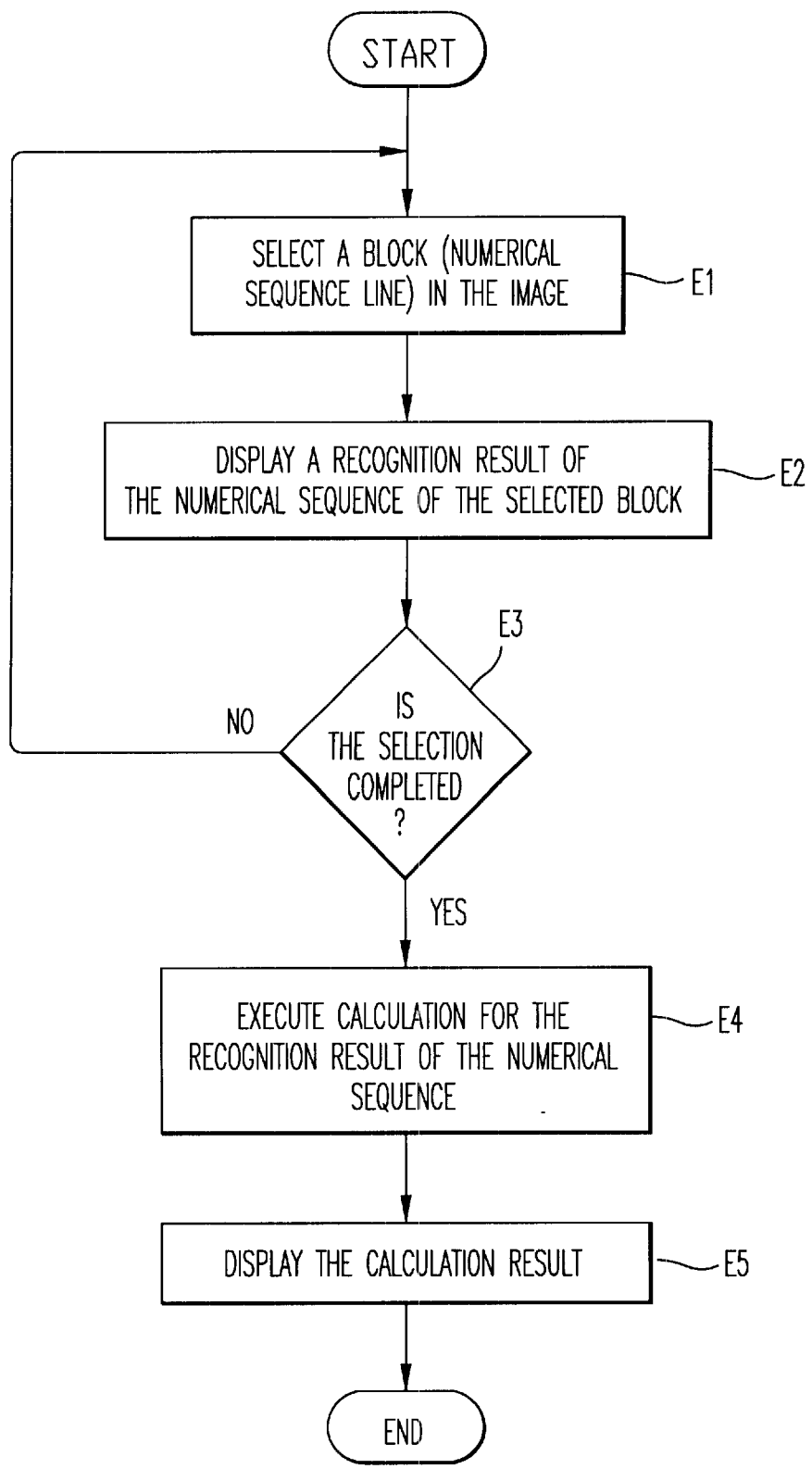
FIG. 12 is a flow chart of the processing of a calculation of numerical data by using the layout information according to the present invention.
Figure 13:
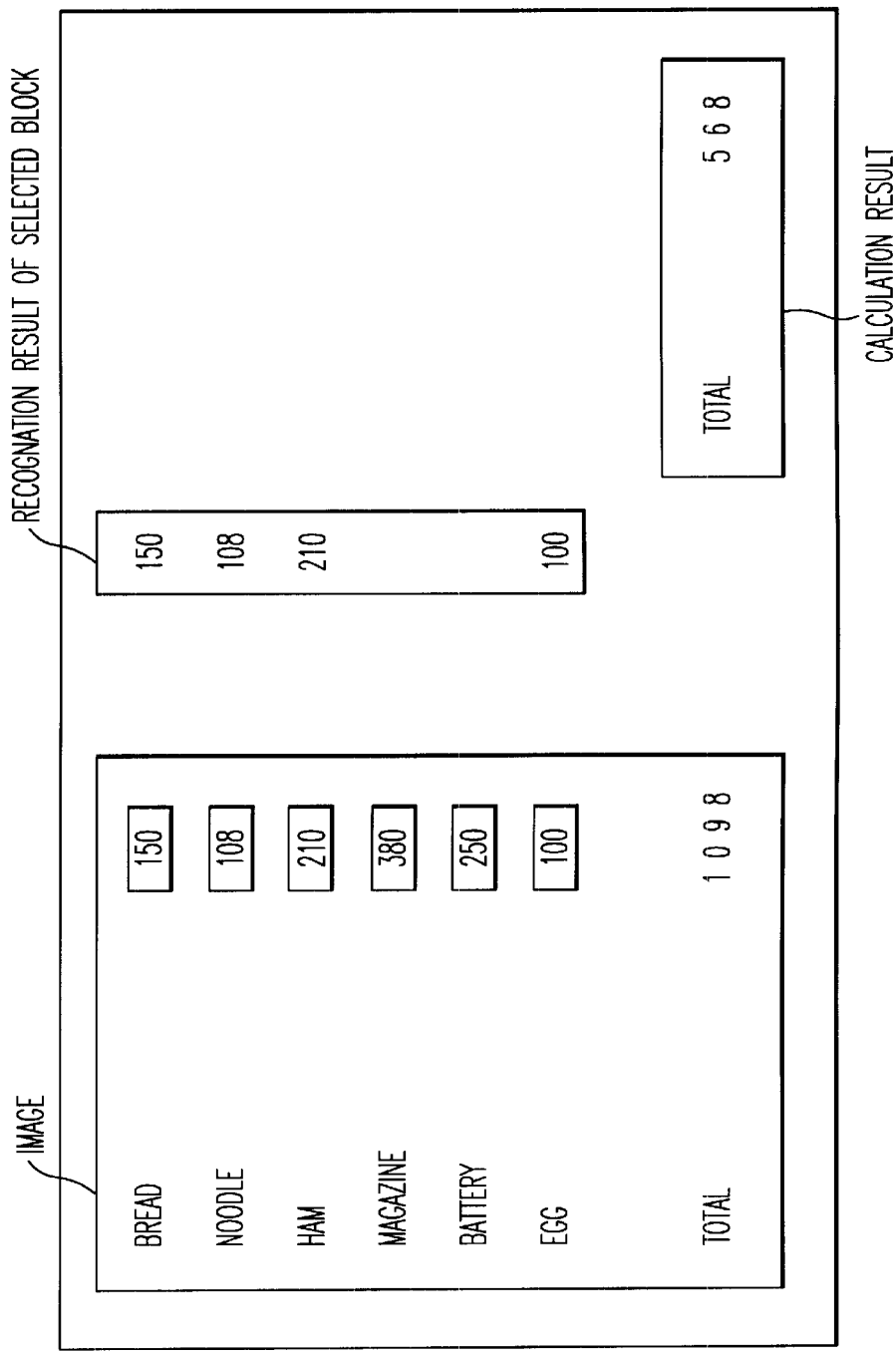
FIG. 13 is a schematic diagram of one example of a screen to display a calculation status of the numeral data.

The modification section 24 executes the calculation of the numeral recognition result corresponding to the indicated position on a displayed document image. FIG. 12 is a flow chart of the calculation processing using the layout information. FIG. 13 shows one example of a display on which the numeral recognition results are calculated. As an initialization mode, the image (left side on the display in FIG. 13) is only shown by the image processing section 20. The layout analysis section 14 previously decides a word block including numerals in each extracted block, and registers numeral block as an attribute of the word block. In this case, the numeral block is decided according to the recognition result of the character recognition section 18, but may be indicated by the operation input section 26 before character recognition processing. As for the numeral block, the character recognition result for characters in the block is set as the numeral. In short, in case a plurality of recognition candidates are obtained by the character recognition section 18, a numeral candidate is registered beforehand in the layout information memory section 16 as the recognition result. Furthermore, if the numeral block is indicated by the user before the character recognition processing, the recognition processing is executed as numeral object in order to prevent an error recognition.

First, when the word block including a numeral image is selected from the displayed document image by the user (step E1), the modification section 24 extracts the numeral recognition result as the attribute of the selected word block from the layout information in the layout information memory section 16, and displays the numeral recognition result corresponding to position of the selected word block (step E2). In this case, the user can select an arbitrary unit of the numeral block to be calculated. In FIG. 13, four numeral blocks (150, 108, 210, 100) are selected by the user. When the selection of the numeral blocks are completed and a calculation indication is input (step E3), the modification section 24 converts each recognition result to actual numeral data according to the character code in each numeral block. In short, the numeral data is generated by a value and a digit position of each character in the numeral block. The modification section 24 executes calculation of the numeral data (step E4), and displays the calculation result at predetermined position on the display (step E5).

In FIG. 13, a total calculation of four numeral sequences (150, 108, 210, 100) is executed and the total value (568) is displayed as the calculation result. In the above explanation, an addition operation is executed as the calculation, but other kinds of calculation may be applied. In this way, the layout structure and corresponding recognition result is previously stored by unit of block. If the block to be calculated is selected on the document image, the recognition result corresponding to the selected block is read from the layout information. In actual calculation processing, the numeral data of the recognition result is used as a calculation object.

A memory device, including a CD-ROM, floppy disk, hard disk, magnetic tape, or semiconductor memory can be used to store instructions for causing a processor or computer to perform the process described above.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A document image processing apparatus, comprising:
  a) image input means for inputting a document as image data;
  b) layout analysis means for analyzing a layout structure of an input image, the layout structure including:
    1) each position of a block, the block being a frame of each paragraph in the document,
    2) a character line block, the character line block being a frame of each character line in the paragraph, and
    3) a word block in the input image, the word block being a frame of each word in the character line;
  c) layout information memory means for hierarchically storing the layout structure as layout information;
  d) image display means for discriminately displaying each block overlapped with a corresponding area in the input image according to the position of each block in the layout information;
  e) operation input means for selecting at least one block from each block in the input image displayed by said image display means, and for inputting an operation command to modify the at least one block; and
  f) modification means for modifying the corresponding area of a selected block in the input image and the layout structure of the selected block in the layout information according to the position of the selected block and the operation command.

2. The document image processing apparatus according to claim 1, wherein said layout analysis means:
  extracts each paragraph from the input image as the block,
  extracts each character line from the paragraph as the character line block, and
  extracts each word from the character line as the word block.

3. The document image processing apparatus according to claim 2, wherein said layout information memory means:
  correspondingly stores the position of the paragraph in the input image and an attribute of the paragraph as block data,
  correspondingly stores the position of the character line in the paragraph and an attribute of the character line as character line block data, and
  correspondingly stores the position of the word in the character line and an attribute of the word as word block data.

4. The document image processing apparatus according to claim 3,
   wherein said layout information memory means hierarchically stores the block data, the character line block data, and the word block data as linked block data of the layout information.

5. The document image processing apparatus according to claim 3, further comprising:
   character recognition means for recognizing each character image included in the word block of the input image, and for generating a character code of each character image as a recognition result, a character code sequence of character images in the word block being the attribute of the word block data.

6. The document processing apparatus according to claim 5,
   wherein said modification means replaces a character original image of the corresponding area of a selected block with character font image by using a character code as a recognition result of the character original image, when the selected block and a type of character font are indicated by said operation input means.

7. The document processing apparatus according to claim 5,
   wherein said modification means extracts recognition results of a plurality of numeral images as each word block from said layout information memory means when the plurality of numeral images are selected from the image data of a block by said operation input means, and calculates numeral codes of the recognition results according to a kind of calculation when the kind of calculation is indicated by said operation input means.

8. The document processing apparatus according to claim 2,
   wherein said modification means moves image data of the corresponding area of a selected block to a new destination and updates the block data of the selected block in the layout information by the new destination, when the selected block and the new destination are indicated by said operation input means.

9. The document processing apparatus according to claim 2,
   wherein said modification means rotates image data of the corresponding area of a selected block by a rotation quantity and updates the block data of the selected block in the layout information by the rotation quantity, when the selected block and the rotation quantity are indicated by said operation input means.

10. The document processing apparatus according to claim 2,
    wherein said modification means enlarges or reduces an image data of the corresponding area of a selected block by an enlargement or a reduction parameter, and updates the block data of the selected block in the layout information by the enlargement or the reduction parameter, when the selected block and the enlargement or reduction parameter are indicated by said operation input means.

11. The document processing apparatus according to claim 2,
    wherein said modification means replaces an original image of the corresponding area of a selected block with a new input image, when the selected block and an input of the new image are indicated by said operation input means.

12. The document processing apparatus according to claim 2,
    wherein said modification means compares a size of an image data of a selected block with a reduction size when the selected block and the reduction size are indicated by said operation input means, reduces a word space or a character line space in the image data of the selected block without reduction of character images in the image data in proportion to the reduction size if the size of the image data of the selected block is reducable by changing the word space or the character line space according to a comparison result, and updates the layout information of the selected block according to the change of the word space or the character line space.

13. The document processing apparatus according to claim 12,
    wherein said modification means uniformly reduces the image data of the selected block in proportion to the reduction size if the size of the image data of the selected block is not reducable by the change of the word space or the character line space according to the comparison result, and updates the layout information of the selected block according to the reduction size.

14. The document processing apparatus according to claim 2,
    wherein said modification means decides character line blocks to be moved and a new destination in the image data of a selected block according to a position of blank space generation in character line space of the selected block when the selected block and the position of blank space generation in the selected block are indicated by said operation input means, moves the character line blocks to the new destination in the image data of the selected block, and updates the layout information of the selected block according to the character line blocks and the new destination.

15. The document processing apparatus according to claim 2,
    wherein said modification means extracts a plurality of the word blocks located between a start position and an end position of an indicated area in an image data of a block according to a relation between the start position and the end position when the start position and the end position are indicated by said operation input means, and edits the plurality of the word blocks including the start position and the end position as the indicated area.

16. The document image processing apparatus according to claim 1, wherein said image display means discriminately displays:
    the block,
    the character line block, and
    the word block, each overlapped with the corresponding area in the input image according to the position of each block.

17. The document processing apparatus according to claim 1, wherein:
    said modification means incrementally assigns a font image of a page number at a predetermined position on the input image whenever the input image is changed, when a pagination operation and the predetermined position are indicated by said operation input means.

18. The document processing apparatus according to claim 1,
    further comprising a modified content memory means for storing a modified content representing a relation between unmodified layout structure and modified layout structure, and wherein said modification means modifies a new input image whose layout structure coincides with the unmodified layout structure according to the stored modified content.

19. A document image processing method, comprising:
a) inputting a document as image data;
b) analyzing a layout structure of an input image, the layout structure including:
   1) each position of a block, the block being a frame of each paragraph in the document,
   2) a character line block, the character line block being a frame of each character line in the paragraph, and
   3) a word block in the input image, the word block being a frame of each word in the character line;
c) hierarchically storing the layout structure as layout information;
d) discriminately displaying each block overlapped with a corresponding area in the input image according to the position of each block in the layout information;
e) selecting at least one block from each block in the input image displayed;
f) inputting an operation command to modify the at least one block; and
g) modifying the corresponding area of a selected block in the input image and the layout structure of the selected block in the layout information according to the position of the selected block and the operation command.

20. A computer readable memory, comprising:
a) instruction means for causing a computer to input a document as image data;
b) instruction means for causing a computer to analyze a layout structure of an input image, the layout structure including:
   1) each position of a block, the block being a frame of each paragraph in the document,
   2) a character line block, the character line block being a frame of each character line in the paragraph, and
   3) a word block in the input image, the word block being a frame of each word in the character line;
c) instruction means for causing a computer to hierarchically store the layout structure as layout information;
d) instruction means for causing a computer to discriminately display each block overlapped with a corresponding area in the input image according to the position of each block in the layout information;
e) instruction means for causing a computer to select at least one block from each block in the input image displayed;
f) instruction means for causing a computer to input an operation command to modify the at least one block; and
g) instruction means for causing a computer to modify the corresponding area of a selected block in the input image and the layout structure of the selected block in the layout information according to the position of the selected block and the operation command.

21. A document image processing apparatus, comprising:
a) an image input unit configured to input a document as image data;
b) a layout analysis unit configured to analyze a layout structure of an input image, the layout structure including:
   1) each position of a block, the block being a frame of each paragraph in the document,
   2) a character line block, the character line block being a frame of each character line in the paragraph, and
   3) a word block in the input image, the word block being a frame of each word in the character line;
c) a layout information memory configured to hierarchically store the layout structure as layout information;
d) an image display configured to discriminately display each block overlapped with a corresponding area in the input image according to the position of each block in the layout information;
e) an operation input unit configured to select at least one block from each block in the input image displayed by said image display, and to input an operation command to modify the at least one block; and
f) a modification unit configured to modify the corresponding area of a selected block in the input image and the layout structure of the selected block in the layout information according to the position of the selected block and the operation command.

* * * * *